United States Patent
Takatori et al.

(10) Patent No.: US 6,716,127 B2
(45) Date of Patent: Apr. 6, 2004

(54) CONTROL SYSTEM FOR AUTOMATIC TRANSMISSION

(75) Inventors: Kazuhiro Takatori, Fuji (JP); Osamu Sato, Fuji (JP); Tatsuya Imamura, Fuji (JP); Toshihide Fukasawa, Fuji (JP)

(73) Assignee: JATCO Ltd (JP)

( * ) Notice: Subject to any disclaimer, the term of this patent is extended or adjusted under 35 U.S.C. 154(b) by 0 days.

(21) Appl. No.: 10/254,045

(22) Filed: Sep. 24, 2002

(65) Prior Publication Data

US 2003/0078129 A1 Apr. 24, 2003

(30) Foreign Application Priority Data

Sep. 26, 2001 (JP) ........................................ 2001-295103

(51) Int. Cl.⁷ .............................................. F16H 59/08
(52) U.S. Cl. .......................... 475/131; 475/116; 475/127
(58) Field of Search ................................. 475/116, 127, 475/131

(56) References Cited

U.S. PATENT DOCUMENTS

| | | | | |
|---|---|---|---|---|
| 3,868,866 A | * | 3/1975 | Lentz | 475/116 |
| 4,796,853 A | * | 1/1989 | Butts et al. | 475/116 |
| 5,784,245 A | * | 7/1998 | Moraghan et al. | 361/154 |
| 5,790,364 A | * | 8/1998 | Mikami et al. | 361/154 |
| 5,992,267 A | * | 11/1999 | Smith et al. | 74/335 |
| 6,007,445 A | * | 12/1999 | Kirchhoffer et al. | 475/116 |
| 6,208,498 B1 | * | 3/2001 | Ueda | 361/154 |
| 6,275,368 B1 | * | 8/2001 | Yamada et al. | 361/140 |
| 6,307,376 B1 | * | 10/2001 | Alexander et al. | 361/154 |
| 2002/0086760 A1 | * | 7/2002 | Hayabuchi et al. | 475/116 |

\* cited by examiner

*Primary Examiner*—Rodney H. Bonck
*Assistant Examiner*—Dennis Abdelnour
(74) *Attorney, Agent, or Firm*—Rossi & Associates

(57) ABSTRACT

A pressure regulating valve regulates an original pressure outputted from a manual valve by means of a control pressure generated by a solenoid in a D range and supplies the regulated original pressure to an engaging element. An electronic control unit filters a current signal supplied to the solenoid to generate the control pressure by using a strong filter when a N range is switched to a D range during stoppage of a vehicle so that the control pressure has a gentle rise characteristic, switches the filtering process to a filtering process using a weak filter to rapidly move the pressure regulating valve in a working pressure discharge direction when the N range is switched to the D range during running of the vehicle and returns the filtering process to the filtering process using a strong filter after a predetermined time period. Thereby, occurrence of shock is suppressed when the D range is again selected after the N range is selected during running in the D range.

4 Claims, 6 Drawing Sheets

Fig.2

| CLUTCH / Gear Position | R/C | H/C | L/C | L&R/B | L/OWC | 2-4/B |
|---|---|---|---|---|---|---|
| 1st |  |  | ◯ | (◯) | ◯ |  |
| 2nd |  |  | ◯ |  |  | ◯ |
| 3rd |  | ◯ | ◯ |  |  |  |
| 4th |  | ◯ |  |  |  | ◯ |
| REV | ◯ |  |  | ◯ |  |  |

CONTROL SYSTEM FOR AUTOMATIC TRANSMISSION

BACKGROUND OF THE INVENTION

1. Field of the Invention

The present invention relates to a control system for an automatic transmission in which occurrence of shock due to a select operation during running of a vehicle is suppressed.

2. Description of the Prior Art

A gear change of the automatic transmission is executed by actuating, of a plurality of frictional engaging elements such as clutches, brakes and the like, an engaging element corresponding to a desired gear position. Operation or non-operation of the engaging elements is performed by supply or discharge of hydraulic pressure to and from the engaging elements, and supply speed or discharge speed of the hydraulic pressure is adjusted by a solenoid so as to control engagement or disengagement of the frictional engaging elements and reduce occurrence of shock.

As such an example, in Japanese Patent Application No. 2001-21653, the applicant has proposed to control a pressure regulating valve by means of a solenoid valve, in which a current signal to be inputted to the solenoid has a stepwise waveform, so that a working pressure to be supplied to an engaging element can be set to a desired value, to modify a rapid rise or fall of waveform of an hydraulic pressure command value and absorb vibrations by filtering the current signal according to each shifting stage, so as to suppress a delay or surge occurring in an actual hydraulic pressure.

However, though the above technique has merits described above, the occurrence of shock cannot be prevented for the following reason, when a driver switches a range selector from a D range to an N range and returns it back to the D range again during the running of the vehicle.

In short, even if the driver switches the range selector from the D range to the N range during the running, the above current signal is unchanged and the pressure regulating valve is held at a maximum working pressure supply position. However, a manual valve is switched because of the select operation to the N range, and the working pressure which has been supplied to the engaging elements till then is discharged from the manual valve.

If the D range is selected again in this condition, a command for lowering current signal to be inputted to the solenoid is issued in order to reduce the working pressure for the purpose of reducing select shock, as in the above select operation from the N range to the D range. However, since this current signal of which reduction was commanded is also filtered, an actual current to be applied to the solenoid generates a delay from the time when the reduction of the current signal is commanded and reduces gradually.

As a result, while a spool of the pressure regulating valve slightly returns from the maximum working pressure supply position due to this delay, an original pressure is outputted at once from the manual valve switched by the select operation and is supplied to the engaging elements with maintaining a high pressure without being reduced to a desired degree by the pressure regulating valve, as a result of which engagement shock occurs.

This condition is shown in FIG. 7. At a time t0 when the range selector is switched from the N range to the D range, a hydraulic pressure command value Pio corresponding to the current signal is rapidly lowered and then gradually increased at once, as indicated by the thick solid line. However, since the current signal is filtered with a strong filter, an actual hydraulic pressure command value Pi corresponding to the actual current is gradually lowered till a time td more slowly than the hydraulic pressure command value Pio, as indicated by the broken line. Therefore, within a time period t0~Td, the rise of a working pressure P exceeds the hydraulic pressure command value Pio, as indicated by the thin solid line, and acts on the engaging elements, thereby causing the occurrence of shock.

SUMMARY OF THE INVENTION

It is therefore an object of the present invention to provide a control system capable of suppressing shock which occurs when a driver switches a range selector from a D range to a N range and returns it back to the D range during the running of a vehicle.

To accomplish the above object, the present invention provides a control system for an automatic transmission, comprising: a manual valve capable of outputting an original pressure depending on a select operation of a driver; a pressure regulating valve capable of supplying a working pressure to be obtained by regulating the original pressure which is supplied from the manual valve to an engaging element to be engaged in a D range; a solenoid for supplying a variable control pressure to the pressure regulating valve and controlling a magnitude of the working pressure to be outputted by the pressure regulating valve; and a control unit for supplying a filtered current to the solenoid, said control unit selecting a filtering process using a weak filter when the driver switches a range selector from the D range to an N range and then again returns it to the D range during running of a vehicle and returning said filtering process using a weak filter to a filtering process using a strong filter after a predetermined time elapsed.

Since a current is applied to the solenoid after the filtering process is changed to the filtering process using a weak filter at the time of the select operation from the N range to the D range, the pressure regulating valve is rapidly switched in a direction in which the working pressure reduces, and a high hydraulic pressure from the manual valve does not act on the engaging elements, thereby preventing a select shock at the time of the select operation during the running of the vehicle.

The above and further objects and features of the invention will be more fully apparent from the following description when the same is considered with reference to the accompanying drawings.

BRIEF DESCRIPTION OF THE DRAWINGS

FIG. 2 is a diagram showing combinations of engagement and disengagement of engaging elements in a transmission mechanism;

DETAILED DESCRIPTION OF THE PREFERRED EMBODIMENTS

Figure 1:
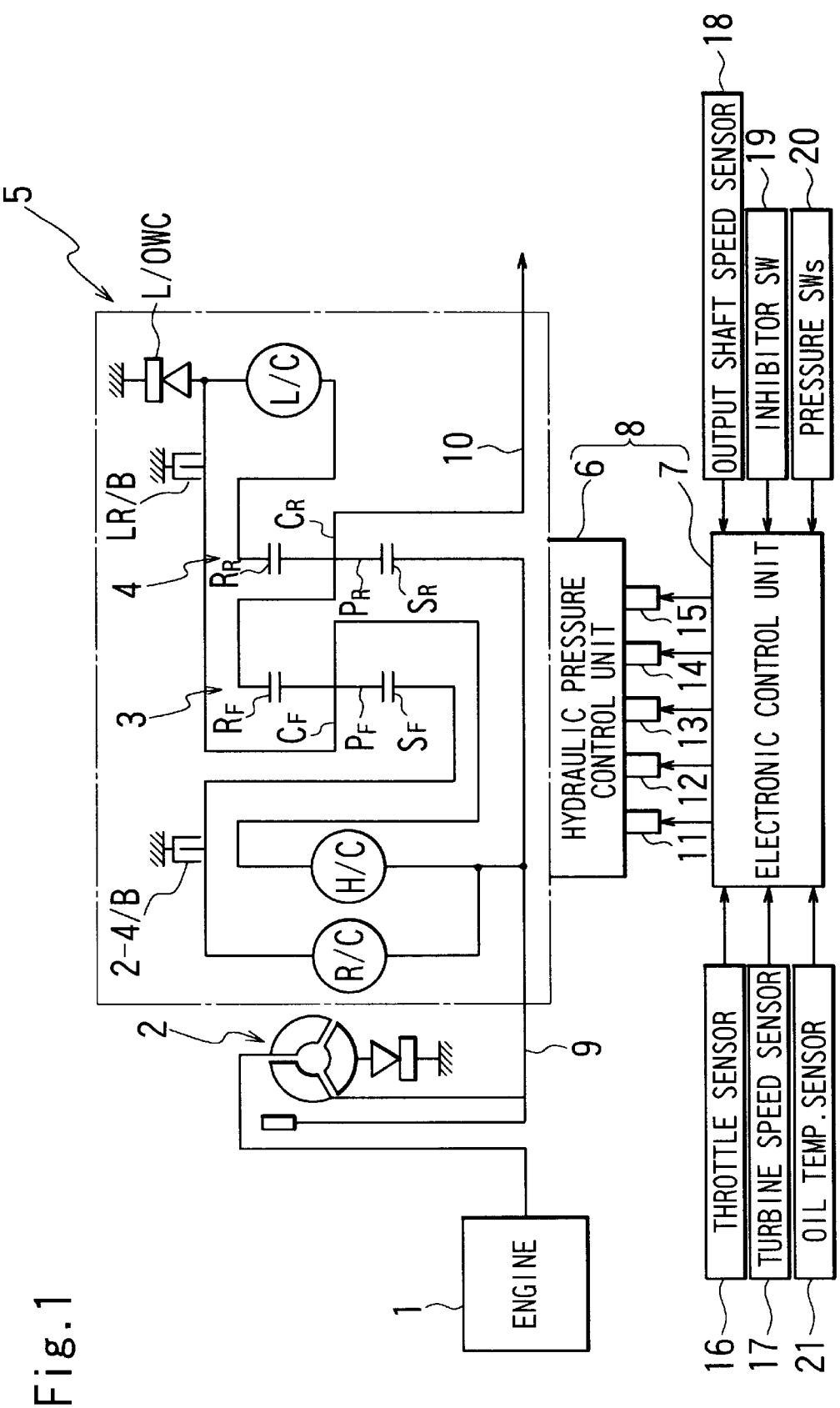
FIG. 1 is a diagram showing a whole construction of an embodiment of the present invention.

FIG. 1 shows a whole construction of an automatic transmission to which this embodiment is applied.

A power train of the automatic transmission is so constructed that a transmission mechanism 5 is connected to an engine 1 through a torque converter 2. The transmission mechanism 5 includes two pairs of planetary gear mechanisms 3, 4 whose power transmission paths are switched by engaging elements comprised of later-described clutches or brakes. The transmission mechanism 5 is also provided with a hydraulic pressure control unit 6 controlling hydraulic pressure for executing engagement and disengagement of the engaging elements and an electronic control unit 7 composed mainly of a microcomputer controlling a later-described solenoid or the like.

Both of the planetary gear mechanisms 3, 4 of the transmission mechanism 5 are comprised of single pinion type planetary gear mechanisms. In short, a first planetary gear mechanism 3 of an upstream side has a first sun gear $S_F$, a first carrier $C_F$ rotatably supporting a plurality of first pinions $P_F$ engaging with the first sun gear $S_F$ and a first ring gear $R_F$ engaging with the first pinions $P_F$. A second planetary gear mechanism 4 of a downstream side has a second sun gear $S_R$, a second carrier $C_R$ rotatably supporting a plurality of second pinions $P_R$ engaging with the second sun gear $S_R$ and a second ring gear $R_R$ engaging with the second pinions $P_R$.

In the first planetary gear mechanism 3, the first sun gear $S_F$ can be connected to an input shaft 9 rotating together with a turbine of the torque converter 2 through a reverse clutch R/C, the first carrier $C_F$ can be connected to the input shaft 9 through a high clutch H/C and the first ring gear $R_F$ is always coupled with the second carrier $C_R$ and an output shaft 10.

On the other hand, in the second planetary gear mechanism 4, the second sun gear $S_R$ is always coupled with the input shaft 9, the second carrier $C_R$ is always coupled with the output shaft 10 and the first carrier $C_F$, and the second ring gear $R_R$ can be fixed through a low clutch L/C and a low one-way clutch L/OWC.

Moreover, the first sun gear $S_F$ can be fixed by a 2-4 brake 2-4/B and the first carrier $C_F$ can be fixed by a low & reverse brake L&R/B or the low one-way clutch L/OWC.

By engaging and disengaging a predetermined combination of engaging elements of the respective clutches or brakes, gear positions of four forward speeds and one reverse speed can be obtained, as shown in FIG. 2. Here, solid circle marks indicate engagement states, a dotted circle mark indicates an engagement state at the time when an engine brake is needed, and others indicate disengaged states.

The hydraulic pressure control unit 6 is so constructed that a control valve, a pressure regulating valve, a selector valve or the like are arranged in oil passages provided in a valve body, and some of these valves can be actuated by solenoids 11~15.

The solenoids 11~15 are controlled by the electronic control unit 7.

The electronic control unit 7 receives signals from various sensors such as a throttle sensor 16, a turbine speed sensor 17, an output shaft speed sensor 18, an inhibitor switch 19, oil pressure switches 20 (turned ON when a working pressure of a corresponding engaging element changes to a pressure at which a piston stroke is completed and the engaging element reaches its engaging capacity), an oil temperature sensor 21 or the like, calculates type of shifting, its timing and magnitude of oil pressure by means of a microcomputer and supplies driving current to the solenoids 11~15.

Figure 3:
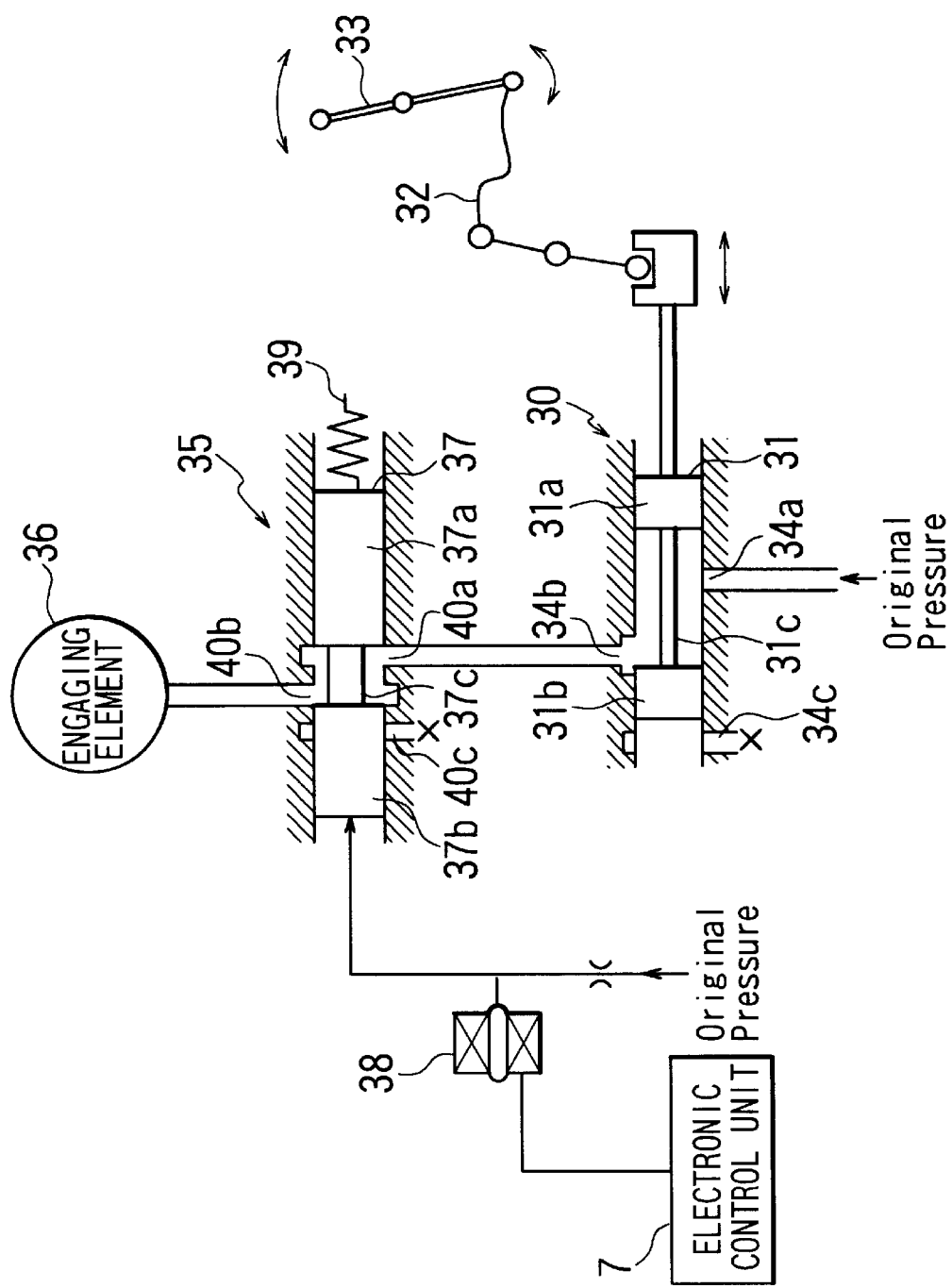
FIG. 3 is a diagram showing a hydraulic circuit.

FIG. 3 is a diagram showing a hydraulic circuit of an engaging element which is engaged at a predetermined forward gear position in the hydraulic pressure control unit 6.

In a manual valve 30, a spool 31 is associated with a selector lever 33 as a range selector through a coupling means 32 such as a linkage, a control cable or the like and can be moved.

The spool 31 is provided with a first land 31a, a second land 31b and a groove 31c disposed between these lands. In the valve body housing this spool 31, an inlet port 34a from which an original pressure is supplied, an outlet port 34b connected to a pressure regulating valve 35 and a drain port 34c are formed in this order toward the left-hand side of FIG. 3, but other ports are omitted in the drawing.

When the selector lever is placed at a D range position, the spool 31 of the manual valve 30 moves to the position as shown, and the inlet port 34a is brought into communication with the outlet port 34b through the groove 31c. Thereby, the original pressure as being guided to the inlet port 34a is supplied to the pressure regulating valve 35, while the second land 31b blocks the drain port 34c from the outlet port 34b and the inlet port 34a.

When the selector lever is placed at an N range position, the second land 31b of the spool 31 moves in the right-hand direction of the outlet port 34b. Thereby, the outlet port 34b is brought into communication with the drain port 34c, and hydraulic pressure of the pressure regulating valve 35 side is discharged, while the second land 31b blocks communication between the outlet port 34b and the inlet port 34a.

The pressure regulating valve 35 has a spool 37 which is provided with a first land 37a, a second land 37b and a groove 37c disposed between these lands. The first land 37a is biased toward a left-hand direction in FIG. 3 by a spring 39, while a control pressure regulated by a solenoid 38 which is controlled by the electronic control unit 7 acts on the second land 37b against a biasing force of the spring 39.

In the valve body housing the spool 37, an inlet port 40a connected to the outlet port 34b of the manual valve 30, an outlet port 40b connected to engaging elements 36 (for example, the low clutch L/C, etc) and a drain port 40c are formed in this order toward a left-hand side in the drawing.

The spool 37 of the pressure regulating valve 35 moves depending on a power relationship between the biasing force of the spring 39 toward the left-hand direction of the drawing and a pushing force by a control pressure generated in the solenoid 38 toward the right-hand direction.

When the control pressure is a maximum value, the spool 37 is moved to the rightmost-hand position shown in the drawing and blocks the drain port 40c by means of the second land 37b, while the inlet port 40a is brought into communication with the outlet port 40b through the groove 37c, and an original pressure supplied to the inlet port 40a can be supplied to the engaging element 36 as it is without being reduced.

On the other hand, when the control pressure is a minimum value (zero), the spool 37 is located on the leftmost side in the drawing and brings the outlet port 40b into communication with the drain port 40c so that oil in the engaging element 36 is discharged, while the first land 37a blocks the inlet port 40a.

Moreover, when the control pressure is a value between the maximum value and the minimum value, the second land 37b opens a part of the drain port 40c to partially drain hydraulic pressure to be supplied from the inlet port 40a, while depressurized remaining hydraulic pressure is supplied from the outlet port 40b to the engaging element 36. As this control pressure increases, the hydraulic pressure to be drained from the drain port 40c reduces, and the hydraulic pressure to be supplied to the engaging element 36 rises.

The electronic control unit 7 controls the solenoid 38 by means of a linear solenoid valve and applies a predetermined current signal obtained by filtering a current signal having a stepwise or rectangular waveform to the solenoid 38. As for a filtering process, a transfer function (first-order lag element) expressed by the following equation is used, for example.

$$G=K/(1+sT)$$

wherein K is a gain, T is a time constant and s is a Laplace operator (or a Laplace variable).

Figure 4:
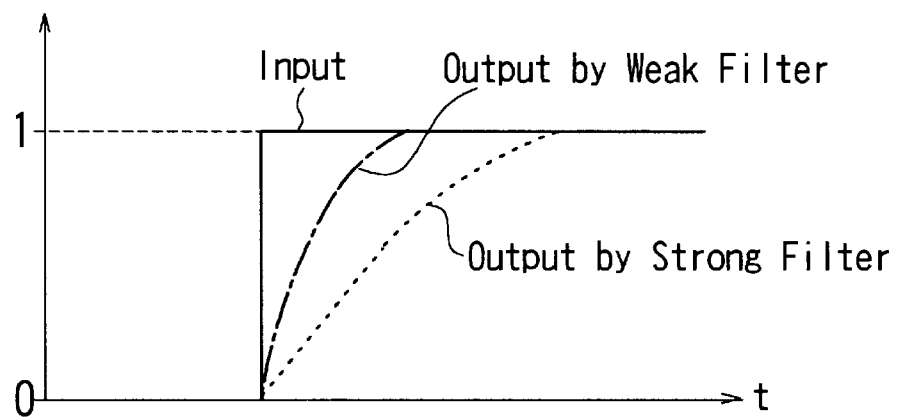
FIG. 4 is an explanatory diagram showing characteristics of filters.

Intensity of filters is set according to magnitude of the time constant T. When the time constant T is a large value, a filtering process using a strong filter is executed, and when the time constant T is a small value, a filtering process using a weak filter is executed. FIG. 4 shows examples of output responses of the case where unit step functions as indicated by the solid lines are inputted to the filters. The broken line shows an output by the strong filter, and the one-dot chain line shows an output by the weak filter.

Figure 5:
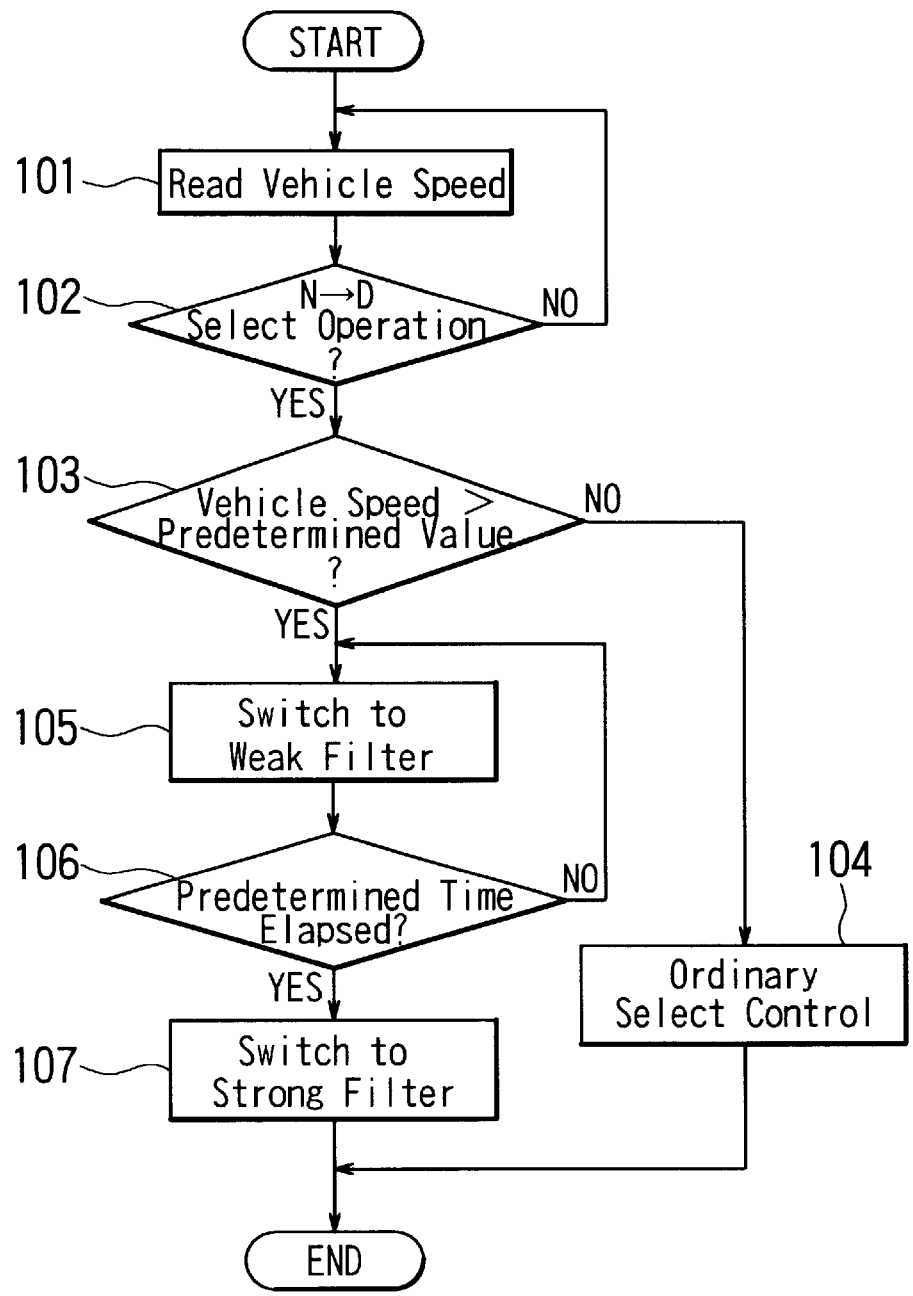
FIG. 5 is a diagram showing a control flow.

The electronic control unit 7 executes controls according to the control flow chart shown in FIG. 5.

At a step 101, the electronic control unit 7 reads a vehicle speed calculated on the basis of a rotating speed of the output shaft 10 detected by the output shaft speed sensor 18.

Then, at a step 102, the electronic control unit 7 detects a select operation from a signal from the inhibitor switch 19 and decides whether it is a select operation switched from the N range to the D range. If the decision at the step 102 is negative, the routine returns to the step 101. If the decision at the step 102 is affirmative, the routine proceeds to a step 103, and a time count by a timer is started.

At a step 103, it is decided whether the vehicle speed read at the step 101 is higher than a predetermined value. If the decision at the step 103 is negative, the routine proceeds to a step 104, and if the decision is affirmative, the routine proceeds to a step 105.

If the vehicle speed is the predetermined value or less, it is decided that the vehicle is substantially stopped, as a result of which an ordinary select control is executed and the filtering process using the strong filter is selected.

If the vehicle speed is more than the predetermined value, it is decided that the vehicle is running, and the filtering process is switched to the filtering process using the weak filter. Then, the routine proceeds to a step 106, it is decided whether an elapsed time counted by the timer from the time when the select operation switched from the N range to the D range is detected reaches a predetermined time.

When the elapsed time does not reach the predetermined time, the routine returns to the step 105 so as to continue the filtering process using the weak filter. On the other hand, when the elapsed time reaches the predetermined time, the routine proceeds to a step 107 to switch the filtering process using the weak filter to the filtering process using the strong filter.

In this case, until the above predetermined time elapses, the electronic control unit 7 inhibits gear change to prevent the increase of shift shock even if the electronic control unit 7 decides that the automatic transmission is in a gear change starting state.

In the thus constructed control unit of the automatic transmission, if the selector lever 33 is switched from the N range to the D range, for example, for the purpose of starting the vehicle, the manual valve 30 is moved to the position shown in FIG. 3 to bring the inlet port 34a into communication with the outlet port 34b, thereby immediately supplying the original pressure (e.g., line pressure) to the inlet port 40a of the pressure regulating valve 35.

Since the electronic control unit 7 applies no current to the solenoid 38 prior to the above select operation, the spool 35 of the pressure regulating valve 35 is moved to the further left-hand side than the position shown in FIG. 3 by the spring 39, the inlet port 40a is blocked from communication with the outlet port 40b, and the outlet port 40b is brought into communication with the drain port 40. Thereby, oil in the engaging element 36 is discharged, and this engaging element is disengaged.

In this case, since it is decided that the detected vehicle speed is the predetermined value or less and the vehicle is stopped, the ordinary select operation wherein the filtering process using the strong filter is performed is executed.

As a result, the supply of current signal from the electronic control unit 7 to the solenoid 38 is started by this select operation, while this current signal is increased from a small value to a large value. At this time, the current signal is processed using the strong filter, and a slowly rising control pressure from the solenoid 38 acts on the second land 37b of the pressure regulating valve 35.

Therefore, the spool 37 is gradually moved to the right-hand side in the drawing depending on the slow rise of control pressure. Thereby, pressure of hydraulic fluid to be supplied to the engaging element 36 increases gradually from the initial low level and becomes equal to the original pressure finally. As a result, a rapid engagement is avoided, and the occurrence of shock at the time of selecting from the N range to the D range is suppressed.

Next, a case where the select operation is performed during running will be explained. Even if the N range is selected during running in the D range, current to be applied to the solenoid 38 is kept to a highest value for the D range, the drain port 40c of the pressure regulating valve 35 is blocked, and the outlet port 40b remains communicated with the inlet port 40a.

On the other hand, by this select operation, the manual valve 34 blocks communication between the inlet port 34a and the outlet port 34b and brings the outlet port 34b into communication with the drain port 34c. Thereby, since the hydraulic fluid in the engaging element 36 is rapidly discharged from the drain port 34c of the manual valve 30 through the pressure regulating valve 35, the engaging element 36 is disengaged.

Figure 6:
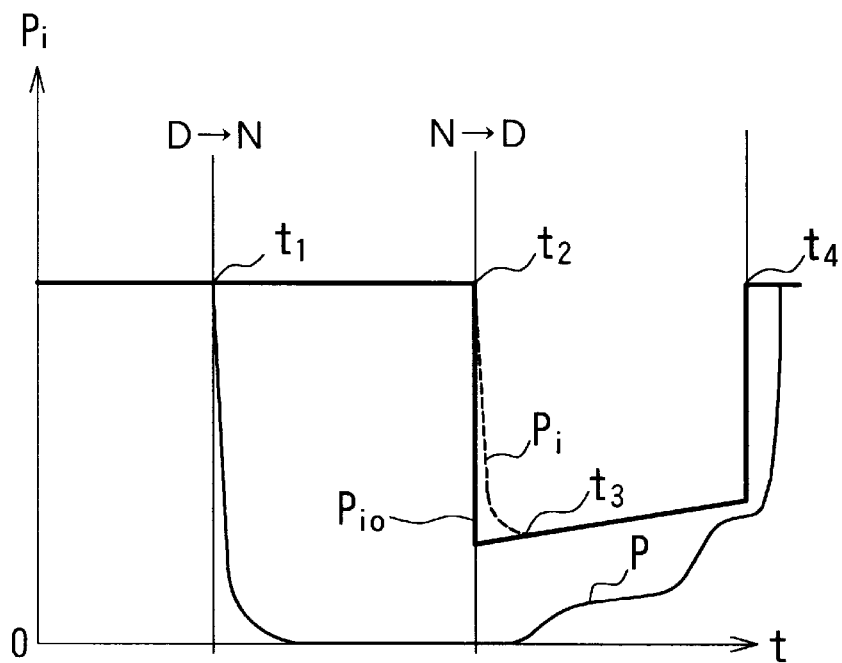
FIG. 6 is a diagram showing a relationship between current to be applied to a solenoid and hydraulic pressure.
Figure 7:
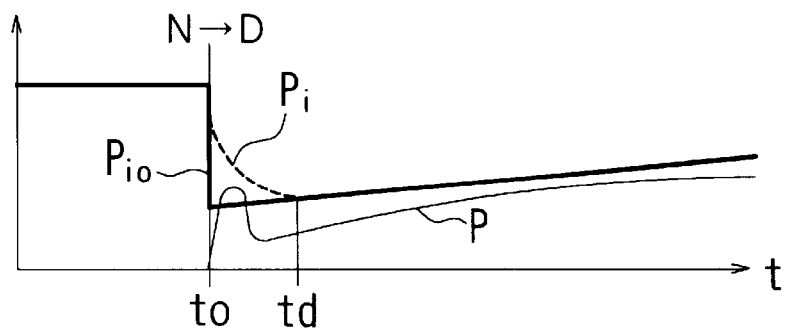
FIG. 7 is a diagram showing a problem of the prior art.

The above condition is shown in FIG. 6. It is understood that a current signal, whose corresponding hydraulic pressure command value Pio is indicated by the thick solid line, and an actual current, whose corresponding actual hydraulic pressure value Pi is indicated by the thin broken line, continue to be supplied at a maximum value even before and after a time t1 when the selector lever is switched from the D range to the N range. On the contrary, an actual hydraulic pressure P, as indicated by the thin solid line, to be supplied to the engaging element 36 is rapidly decreased from a maximum pressure (equal to the original pressure) to zero.

Since the vehicle speed is higher than the predetermined value when the D range is selected following the N range, that is, the vehicle is running, the electronic control unit 7 selects the filtering process using the weak filter and processes the current signal. As a result, at a time point t2 when the selector lever is switched from the N range to the D range, the hydraulic pressure command value Pio equivalent to a current signal supplied until then is immediately lowered and then increased, as shown by the thick solid line, but the actual current (corresponding to Pi) is lowered with a slight delay and rapidly by the filtering process using the weak filter, as shown by the broken line. Thereby, the spool 37 of the pressure regulating valve 35 is rapidly moved back from a hydraulic fluid maximum supply position to a hydraulic fluid full discharge position to widely open the drain port 40c.

By the above select operation, the original pressure is immediately supplied from the manual valve 30 to the pressure regulating valve 35. However, since the pressure regulating valve 35 opens the drain port 40c fully, the original pressure does not act on the engaging element 36. In short, even if the hydraulic pressure command value Pio equivalent to the current signal is increased, as shown in FIG. 6, the actual hydraulic pressure command value Pi equivalent to current is fully lowered due to a slight delay by the filtering process using the weak filter and the hydraulic fluid pressure P remains zero until a time t3 when a predetermined time elapsed.

When the time t3 when a predetermined time elapsed is passed after the detection of the select operation, the filtering process using the weak filter is switched to the filtering process using the strong filter. Thereby, as the hydraulic pressure command value Pio equivalent to the current signal increases, the actual hydraulic pressure command value Pi equivalent to the actual current increases. Therefore, the control pressure to the pressure regulating valve 35 generated by the solenoid 38 rises gradually, too. As a result, a rise of the working pressure to the engaging element 36 becomes also slow, so that engagement shock can be avoided.

Then, the hydraulic pressure command value Pio equivalent to the current signal rises at a time t4, the working pressure is set to a level equal to the original pressure, and the engaging element 36 is held in an engagement state with no slip.

The present embodiment is constructed as described above, and by filtering current signal with the strong filter and applying it to the solenoid generating control pressure for controlling the pressure regulating valve at the time of the select operation switched from the N range to the D range during stoppage of the vehicle, the pressure regulating valve is controlled by control pressure having a gentle gradient, so that the engagement element is gradually engaged and the select shock is reduced.

Moreover, in case where the driver switches the selector lever as a range selector from the D range to the N range and then again returns it to the D range during the running of the vehicle, the above filtering process is switched to the filtering using the weak filter during a predetermined period of time. Thereby, since a smooth control of the hydraulic fluid pressure supplied and discharged with respect to the engaging element for gear change becomes impossible, the gear change is inhibited specially during this time and the select shock can be reduced.

In this case, moreover, the filtering process using the strong filter selected again after the predetermined time elapsed is performed by a filter having the same intensity as that of a filter used in the filtering process at the time of stoppage of the vehicle. Therefore, the filtering processes require only two kinds of filters, so that a simplified construction can be achieved.

Additionally, the above embodiment describes the use of a timer exclusively used for counting time from the time when the select operation from the N range to the D range is performed, but it goes without saying that a timer for managing a time count of the whole control system may be employed.

Further, the relation between current applied to the solenoid and control pressure may be reversed. In short, current may be increased with reducing control pressure. In this case, the direction of control of current becomes contrary to the case of the above embodiment.

What is claimed is:

1. A control system for an automatic transmission, comprising:
   a manual valve capable of outputting an original pressure depending on a select operation of a driver;
   a pressure regulating valve capable of supplying a working pressure to be obtained by regulating the original pressure which is supplied from the manual valve to an engaging element to be engaged in a D range;
   a solenoid for supplying a variable control pressure to the pressure regulating valve and controlling a magnitude of working pressure to be outputted by the pressure regulating valve; and
   a control unit for supplying a filtered current to the solenoid;
   said control unit selecting a filtering process using a weak filter when the driver switches a range selector from the D range to an N range and then again returns it to the D range during running of a vehicle and returning said filtering process using a weak filter to a filtering process using a strong filter after a predetermined time elapsed.

2. A control system for an automatic transmission according to claim 1, wherein the control unit supplies the filtered current to the solenoid when the range selector is switched from the N range to the D range during a stoppage of the vehicle.

3. A control system for an automatic transmission according to claim 2, wherein the filtering process using a strong filter switched after the predetermined time elapsed employs a filter as strong as a filter used in a filtering process performed when the range selector is switched from the N range to the D range during the stoppage of the vehicle.

4. A control system for an automatic transmission according to one of claims 1 to 3, wherein gear change is inhibited during said predetermined time.

* * * * *